(No Model.)
B. A. DAVIS.
TWO WHEELED VEHICLE.
No. 507,789. Patented Oct. 31, 1893.
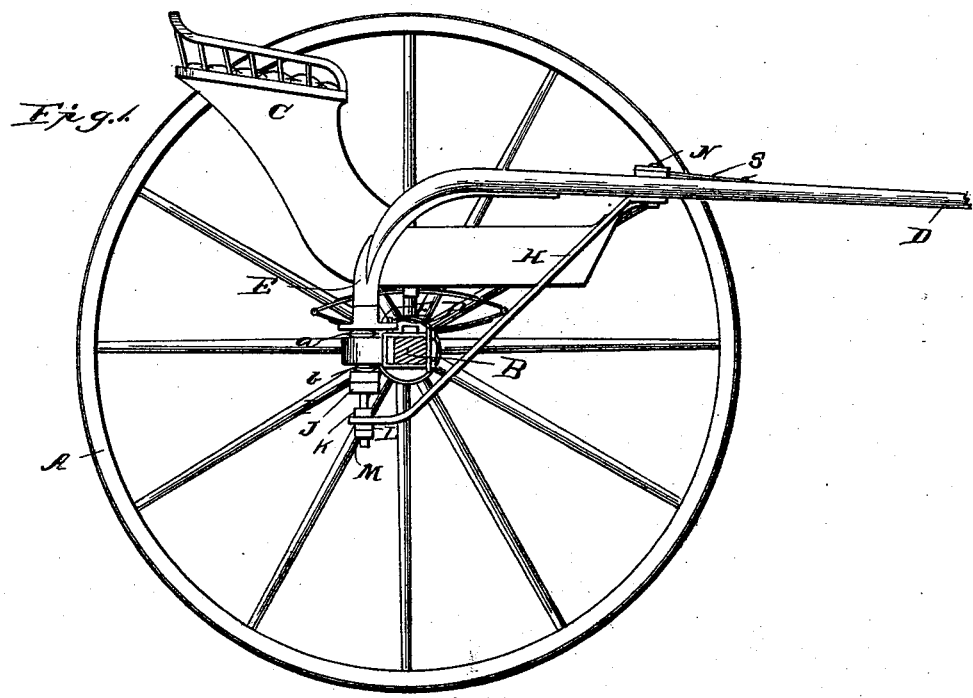
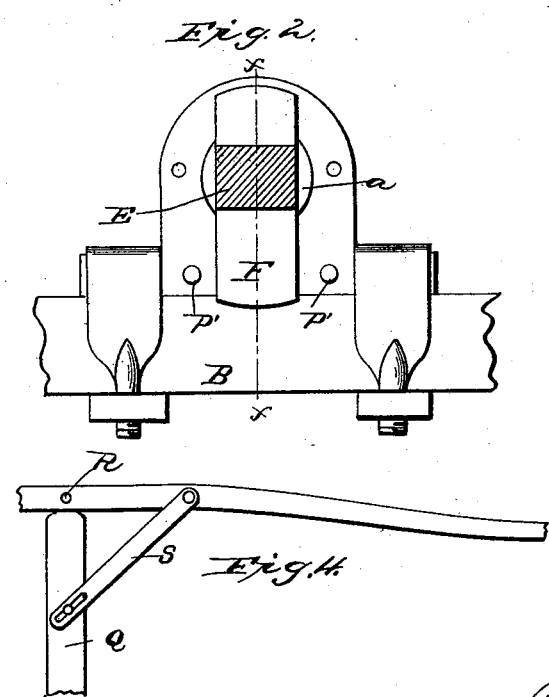
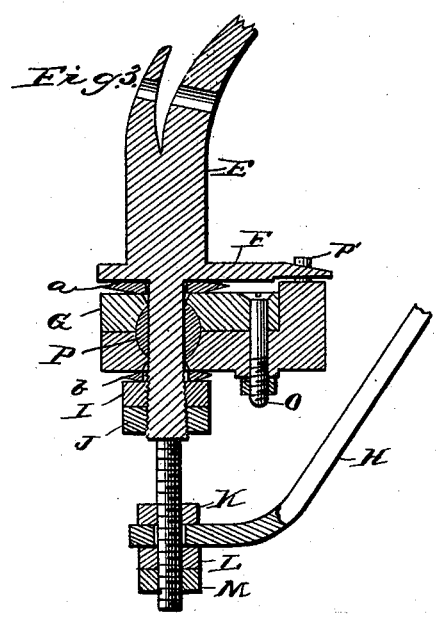
Witnesses
J. M. Fowler Jr
Curtis Lammond
Inventor
Benjamin A. Davis
By Wm. C. R. W. McIntire
Attorney.

UNITED STATES PATENT OFFICE.

BENJAMIN A. DAVIS, OF PETERSBURG, VIRGINIA, ASSIGNOR TO GEORGE DAVIS, OF SAME PLACE.

TWO-WHEELED VEHICLE.

SPECIFICATION forming part of Letters Patent No. 507,789, dated October 31, 1893.

Application filed February 13, 1893. Serial No. 462,018. (No model.)

*To all whom it may concern:*

Be it known that I, BENJAMIN A. DAVIS, a citizen of the United States, residing at Petersburg, in the county of Dinwiddie and State of Virginia, have invented certain new and useful Improvements in Two-Wheeled Vehicles; and I do hereby declare the following to be a full, clear, and exact description of the invention, such as will enable others skilled in the art to which it appertains to make and use the same.

My invention relates to certain new and useful improvements in two-wheeled vehicles such as sulkies, dog-carts and gigs, and particularly to such features of construction therein as are designed to counteract or overcome what is known as the "horse motion" transmitted to the rider through the shafts.

My invention has for its object to so construct the shafts, and so connect them with the axle of the vehicle, as that all vertical or lateral motions which would otherwise be transmitted by the horse to the rider shall be avoided.

With these ends in view my invention consists in the details of construction or arrangement hereinafter described and as illustrated in the accompanying drawings.

In order that those skilled in the art to which my invention appertains may fully understand the same I will proceed to describe the construction and arrangement of the devices employed, referring by letter to the accompanying drawings, in which—

Figure 1 is a side elevation of a two-wheeled cart embodying the features of my invention, the axle being shown in section to more fully illustrate the relation of the several parts. Fig. 2 is a detail plan view showing the means by which the shafts are connected to the axle. Fig. 3 is a vertical section taken at the line *x*, *x* of Fig. 2; and Fig. 4 is a detail, partial plan view of the shaft and cross bar, showing the means of bracing the same, at the same time permitting slight lateral movement.

Similar letters of reference indicate like parts in the several views.

A represents the wheel, B the axle and C the body of an ordinary road cart or sulky. The latter may be supported upon the axle or hung to the shafts in any suitable or desirable manner, as this hanging of the body does not involve my invention which, as before stated, relates more particularly to the construction and arrangement of the shafts and their attachment to the axle of the vehicle, which I will now proceed to describe in detail.

D is the shaft, or shafts, constructed in the usual manner and bowed at the rear end to fit within and be embraced by the forged connecting iron E, which is provided with a foot F, designed to rest upon a casting G, which in turn is secured by clips or bolts to the rear side of the axle of the vehicle, as clearly indicated in Fig. 1. The forging E is extended below the foot F and passes through the casting G downwardly for a sufficient distance to receive and connect with an angle iron or brace H. A nut I is run up upon the extension of the forging below the casting, so that the foot F may be brought down as close as desired to the top surface of the casting, and a check nut J is employed to hold the nut I in position. The extended portion of the forging is decreased in diameter below the nuts I, J and threaded as shown so as to receive a collar K, binding nut L and check nut M, in order that the brace H may be secured in place, as clearly indicated at Fig. 2, and adjusted to suit any variations of arrangement, the forward end of the brace being connected to the shaft D by an ordinary screw bolt N.

The casting G is made in two parts; the upper portion formed with lateral arms by which it is secured to the axle, and the bottom portion adapted to fit snugly in place upon the upper portion, the two parts being secured together by screw bolts and nuts O, or they may be permanently riveted together. The interior of these two portions of the casting is hollowed out to receive a spherical bearing P, which in turn is bored out axially in a vertical line to allow the passage of the cylindrical lower end of the forging E. Beveled washers *a*, *b*, are placed between the footing F and casting G and between the under side of the said casting and the securing nut I, as clearly illustrated at Fig. 3. The casting G is formed with upwardly projecting teats P' and the toe of the footing extends between the same to limit the lateral oscillatory movement of said toe.

It will be seen that the casting provided with the ball or spherical bearing therein and having the iron forging of the shaft passing therethrough is such that a universal movement is permitted to any degree, limited of course by the adjustment of the parts; that is to say, if the nut J is run up tightly the footing F will be drawn down closely upon the casting and a much more limited movement is thus permitted than would be the case if the footing were held farther away from the top of the casting, and it will be seen that as the horse rises in action, thus lifting the shafts, said shafts may vibrate at their rear ends through the medium of the spherical bearing in the casting, and thus said motion will not be felt by the rider; and by reason of said universal connection it will also be seen that any lateral or side-wise movement of the horse in the ordinary gaits of travel will be compensated for by the transverse movements of the shafts through the universal bearing in the casting, and in order that each of the two shafts may be independent of each other in this limited side-wise movement they are connected near their rear ends by a cross brace Q, which is tenoned at each end through the shafts and connected thereto by a pivot R, the shoulder of the tenon being slightly rounded or curved to permit of a limited vibratory movement. In order to limit this vibratory movement of the shafts to such an extent as is only necessary, I supply a brace S between the brace Q and shaft, and connect it to the brace Q by means of a screw bolt passing through a slot in the end of brace S, as clearly illustrated at Fig. 4.

As the movement of the shafts at their rear ends, resulting from the action of the horse, is in a measure proportioned to the length of the shafts, or, in other words, as a very large movement at the free ends of the shafts will be compensated for by a very slight movement at the rear end where they are connected with the axle, it will be understood that only a limited amount of play need be necessarily given in such connections, and that consequently the shafts are not in the ordinary sense loose or wabbling, and as all of the connections are adjustable any necessary variation suited to the action or size of the animal used may be readily varied.

I do not wish to be limited to the exact details of construction in the several parts, nor to the exact arrangement delineated and described, because it is apparent that many variations may be made without departing from the spirit of my invention, the gist of which rests in the idea of connecting the rear end of the shaft to the axle through the medium of a universal joint or bearing which will permit of vertical and sidewise movement of the same.

What I claim as new, and desire to secure by Letters Patent, is—

1. In combination with the axle B of a two-wheeled vehicle and the shafts D, provided with forged extensions E, a casting or box G adapted to be secured to the axle and provided with a chord spherical bearing P adapted to receive the end of forging E, substantially as and for the purpose set forth.

2. In combination with the forging E, constructed as described, the casting G and spherical bearing P, the washers $a$, $b$, and nuts I, J, substantially as described.

3. The combination of the forging E, provided with a foot F, with the casting G having teats P', substantially as and for the purpose set forth.

4. The forging E extended below the casting G to receive the end of the brace H, and threaded to receive the nuts K, L, M, substantially as and for the purpose set forth.

5. The combination with the shaft D, forging E, casting G and axle A, the brace H, substantially as and for the purpose set forth.

6. The combination and arrangement of the shafts D, brace Q, and slotted brace S, substantially as and for the purpose set forth.

In testimony whereof I affix my signature in presence of two witnesses.

BENJAMIN A. DAVIS.

Witnesses:
W. M. WILLCOX,
J. H. POLLARD.